US007495059B2

(12) United States Patent
Schümann et al.

(10) Patent No.: US 7,495,059 B2
(45) Date of Patent: Feb. 24, 2009

(54) REMOVABLE POLYURETHANE PSA

(75) Inventors: Uwe Schümann, Pinneberg (DE);
Kirstin Weiland, Hamburg (DE);
Philippe Hesse, Buchholz (DE)

(73) Assignee: tesa AG, Hamburg (DE)

(*) Notice: Subject to any disclaimer, the term of this patent is extended or adjusted under 35 U.S.C. 154(b) by 424 days.

(21) Appl. No.: 11/474,307

(22) Filed: Jun. 23, 2006

(65) Prior Publication Data
US 2007/0254152 A1 Nov. 1, 2007

(30) Foreign Application Priority Data
Apr. 28, 2006 (DE) ........................ 10 2006 020 482

(51) Int. Cl.
C08F 283/04 (2006.01)
C09J 201/00 (2006.01)

(52) U.S. Cl. ..................................... 525/453; 156/331.1
(58) Field of Classification Search .................. 525/453
See application file for complete search history.

(56) References Cited

U.S. PATENT DOCUMENTS

| 3,246,049 A | 4/1966 | Webber |
| 3,437,622 A | 4/1969 | Dahl |
| 3,515,773 A | 6/1970 | Dahl |
| 3,718,712 A | 2/1973 | Tushaus |
| 3,743,616 A | 7/1973 | Kest |
| 3,743,617 A | 7/1973 | Kest |
| 3,761,307 A | 9/1973 | Dahl |
| 3,796,678 A | 3/1974 | Bartizal |
| 3,879,248 A | 4/1975 | Kest |
| 3,925,283 A | 12/1975 | Dahl |
| 3,930,102 A | 12/1975 | Müller et al. |
| 4,087,392 A | 5/1978 | Hartmann et al. |
| 4,626,475 A | 12/1986 | Goel et al. |
| 4,661,542 A | 4/1987 | Gilch et al. |
| 4,855,077 A | 8/1989 | Shikinami et al. |
| 5,102,714 A | 4/1992 | Mobley et al. |
| 5,157,101 A | 10/1992 | Orr |
| 5,227,409 A | 7/1993 | Mobley et al. |
| 5,486,570 A | 1/1996 | St. Clair |
| 5,591,820 A | 1/1997 | Kydonieus et al. |
| 5,693,584 A | 12/1997 | Le-Khac |
| 5,712,216 A | 1/1998 | Le-Khac et al. |
| 5,714,543 A | 2/1998 | Shah et al. |
| 5,910,536 A | 6/1999 | Kydonieus et al. |
| 5,952,261 A | 9/1999 | Combs |
| 6,040,028 A | 3/2000 | Cline et al. |
| 7,091,300 B2 * | 8/2006 | Luhmann et al. ............... 528/56 |

FOREIGN PATENT DOCUMENTS

| CA | 24 71 252 A1 | 6/2003 |
| DE | 1 904 102 | 8/1970 |
| DE | 2 139 640 | 2/1973 |
| DE | 24 35 217 A1 | 2/1975 |
| DE | 24 35 218 A1 | 2/1975 |
| DE | 42 33 289 A1 | 4/1994 |
| DE | 100 30 908 | 2/2001 |
| EP | 0 081 103 A1 | 6/1983 |
| EP | 0 597 636 A1 | 5/1994 |
| EP | 0 882 749 A2 | 12/1998 |
| EP | 0 979 835 A1 | 2/2000 |
| EP | 1 088 871 A1 | 4/2001 |
| EP | 1 095 993 A2 | 5/2001 |
| EP | 1 101 807 A2 | 5/2001 |
| EP | 1 108 768 A2 | 6/2001 |
| EP | 1 469 024 A1 | 10/2004 |
| EP | 1 469 055 A1 | 10/2004 |
| GB | 1113925 | 5/1968 |
| GB | 1 216 672 | 12/1970 |
| JP | 59 227922 | 12/1984 |
| JP | 59 230076 | 12/1984 |
| JP | 63 189486 | 8/1988 |
| JP | 63 260977 | 10/1988 |
| JP | 1 156386 | 6/1989 |
| JP | 2 3476 | 1/1990 |
| JP | 2000 73040 | 3/2000 |
| JP | 2000 256638 | 9/2000 |

(Continued)

OTHER PUBLICATIONS

Kirk-Othmer's Encyclopedia of Chemical Technology ; "UV Stabilizers"; 3rd ed. vol. 23, pp. 615-627 (Cited in specification on p. 9, last paragraph).

G. R. Lappin; "Ultraviolet-radiation absorbers"; Encyclopedia of Polymer Science and Technology; vol. 14, pp. 125-148 (Cited in specification on p. 9, last paragraph).

*Primary Examiner*—Randy Gulakowski
*Assistant Examiner*—Kyle Baumstein
(74) *Attorney, Agent, or Firm*—Norris McLaughlin & Marcus PA

(57) ABSTRACT

Polyurethane-based pressure-sensitive adhesive, characterized in that the polyurethane is composed of the following starting materials which are reacted catalytically with one another in the stated proportions:
a) at least one aliphatic or alicyclic polyisocyanate having a functionality of in each case less than or equal to three,
b) a combination of at least one triol A based on polypropylene glycol and having an average number-averaged molecular weight $M_n$ of less than or equal to 1000 and a triol B based on polypropylene glycol and having an average number-averaged molecular weight $M_n$ of greater than or equal to 1000, preferably greater than or equal to 3000, the ratio of the number of hydroxyl groups of the triol component A to the number of hydroxyl groups of the triol component B being between greater than 0 and 12,
the ratio of the number of isocyanate groups to the total number of hydroxyl groups being between 0.8 and 1.15, preferably between 0.95 and 1.05,
the catalyst for the reaction to the polyurethane consisting of or comprising a compound comprising bismuth and carbon, preferably a bismuth carboxylate or a bismuth carboxylate derivative.

14 Claims, No Drawings

FOREIGN PATENT DOCUMENTS

| | | |
|---|---|---|
| JP | 2000 256639 | 9/2000 |
| JP | 2000 328034 | 11/2000 |
| JP | 2001 146577 | 5/2001 |
| WO | WO 94/07935 | 4/1994 |
| WO | WO 97/22642 | 6/1997 |
| WO | WO 98/30648 | 7/1998 |
| WO | WO 98/31760 | 7/1998 |
| WO | WO 99/51657 | 10/1999 |
| WO | WO 99/51661 | 10/1999 |
| WO | WO 99/56874 | 11/1999 |
| WO | WO 99/59719 | 11/1999 |
| WO | WO 99/64152 | 12/1999 |
| WO | WO 99/64493 | 12/1999 |
| WO | WO 01/62818 A1 | 8/2001 |

* cited by examiner

REMOVABLE POLYURETHANE PSA

The invention relates to a pressure-sensitive adhesive (PSA) based on a chemically crosslinked polyurethane which attaches well to polar plastics surfaces, which even after a prolonged period of bonding is removable softly and easily, without clattering, which does not damage the plastic surfaces during its detachment, and does not leave residues or spots with a greasy appearance, which, additionally, can be used more than once, can be removed by washing and is stable to light, and further relates to reactive coating processes for its solvent-free and water-free, continuous preparation, and also relates to the use of the PSA for producing self-adhesive articles.

BACKGROUND OF THE INVENTION

Pressure-sensitive adhesion properties or intrinsic adhesion properties are not typical of polyurethanes. Although polyurethanes occupy position five in the list of plastics, in terms of the amounts produced, PSAs of this material play only a very minor role economically.

Nevertheless, polyurethane PSAs have been known for a long time and are described diversely.

The effect of pressure-sensitive adhesiveness can be obtained by adding tackifier resins and/or plasticizers to the polyurethane base polymer. This method is described in, for example, U.S. Pat. No. 3,437,622 A (Dahl et al., Continental Tapes), U.S. Pat. No. 3,718,712 A (Tushaus et al., 3M), U.S. Pat. No. 4,087,392 A (Hartmann et al., BASF), DE 19 04 102 A1 (Hagenweiler, BASF) and JP 2000 256 639 A1 (Toyo).

PSAs of this kind generally have the drawback of not attaching selectively only to certain surfaces. Moreover, following a prolonged period of bonding, they unite—usually strongly—with the surfaces and therefore often cannot be removed. It is also possible for the tackifier resin to migrate into the bonded surfaces, where it leaves behind spots which have a greasy appearance.

High peel increase on numerous adhesion substrates, the resultant difficulty of redetachment, and the tendency to leave behind spots with a greasy appearance on many adhesion substrates, are observed not least for those PSAs where the pressure-sensitive adhesiveness is obtained by under-crosslinking: i.e. an amount of isocyanate groups in deficit to the isocyanate-reactive groups, such as hydroxyl or amino groups, for example.

PSAs designed on the principle of undercrosslinking are described for example in U.S. Pat. No. 5,157,101 A (Orr, Norwood), DE 24 35 218 A (Adsley et al., Adhesive Tapes), JP 59 227 922 A1 (Sanyo), U.S. Pat. No. 3,930,102 A (Szonn et al., Beiersdorf), U.S. Pat No. 5,714,543 A (Kydonieus et al., Bristol Myers Squibb), EP 0 597 636 A1 (Kydonieus et al., Squibb) and U.S. Pat. No. 5,591,820 A (Kydonieus et al., Squibb).

Polyurethane PSAs containing monools fall into a very similar category with analogous weaknesses. Polyurethanes of this kind are likewise undercrosslinked and therefore contain relatively large fractions of migratable polyurethane units of low molecular weight. Polyurethane PSAs on this basis are known for example from EP 0 882 749 A1 (Ikeda et al., Nitto), U.S. Pat. No. 5,227,409 A (Mobley et al., Dow) and U.S. Pat. No. 5,102,714 A (Mobley et al., Dow).

Another type of polyurethane PSAs uses polyol components which carry hydroxyl groups and contain carbon-carbon double bonds. Polyurethane PSAs on this basis are set out for example in JP 02 003 476 A1 (Tsubota et al., Shinko), WO 98/30648 A1 (Gerard et al., Shell), JP 59 230 076 A1 (Sekisui), JP 2001 146 577 A1 (Toyo), U.S. Pat. No. 3,879, 248 A (Kest), U.S. Pat. No. 3,743,616 A (Kest), U.S. Pat. No. 3,743,617 A (Kest), U.S. Pat. No. 5,486,570 A (St. Clair, Shell) and U.S. Pat. No. 3,515,773 A (Dahl et al., Continental Tapes). A drawback is the oxidative sensibility of these PSAs, caused by the double bonds in the polymer main chain. After a certain time this leads to filming or to "blunting" of the pressure-sensitively adhesive surface. In addition the majority of PSAs of this type additionally contain resins, with the disadvantages already described earlier on above.

A special polyurethane PSA containing carbon-carbon double bonds and based on castor oil, a natural product, is described in U.S. Pat. No. 3,246,049 A (Webber, Norton). Here again the oxidative sensitivity is to be regarded as a weakness.

EP 0 979 835 A1 (Questel et al., Elf Atochem) proposes hydroxyl-terminated polyalkylenes as a polyol component, which will solve the problem of oxidative sensitivity. The compositions, however, are moisture-curing, consequently obtain a high ultimate cohesive strength and cannot be used more than once, so that they are unsuitable for reversible adhesive bonding. Furthermore they contain tackifier resins and plasticizers, whose disadvantages have already been described earlier on above.

Moisture-curing polyurethane PSAs are also described in, for example, U.S. Pat. No. 4,661,542 A (USM), JP 63 189 486 A1 (Sanyo) and AU 86 53399 A (von Voithenberg et al., Emhart).

A polyurethane PSA based on hydrogenated polybutadienes is described in JP 01 156386 A1 (Uehara et al., Hitachi). A drawback there is the need for electron beam crosslinking, which involves a considerable level of technical complexity.

A polyurethane PSA likewise requiring electron beam curing is known from JP 63 260 977 A1 (Uehara et al., Hitachi). It uses polyethers as a polyol component.

Certain publications describe polyurethane-including blends or polyurethane copolymers having pressure-sensitive adhesive properties. Examples include U.S. Pat. No. 5,910, 536 A (Kydonieus et al., Bristol Myers Squibb), U.S. Pat. No. 5,714,543 A (Shah et al., Bristol Myers Squibb) and U.S. Pat. No. 4,626,475 A (Barnett et al., Ashland Oil). These PSAs generally feature a heightened tack and are therefore difficult to remove from sensitive substrates without damaging them. As a general rule their pressure-sensitive adhesiveness is not limited selectively to particular adhesion substrates.

Polyurethane PSAs having special additional properties, such as flame retardancy or electrical conductivity, for example, are described in, for example, EP 1 108 768 A1 (Wong, Tyco) or U.S. Pat. No. 4,855,077 A (Hata et al., Takiron).

Foamed polyurethanes having pressure-sensitive adhesive properties are likewise known. An example that may be mentioned is DE 24 35 217 A1 (Adsley et al., Adhesive Tapes), and also the descriptions of hydrophilic foams in DE 42 33 289 A1 (Kenndoff et al., Beiersdorf) and WO 94/07935 A1 (Kenndoff et al., Beiersdorf).

In principle, as a result of the enlargement of surface area, foamed polyurethanes have the drawback of a heightened oxidative sensitivity and also of a heightened light sensitivity. In practice it has been found that they exhibit strong peel increase on the majority of substrates and either cannot be removed without damage or else, particularly in the case of the foams made hydrophilic by additions of superabsorbent, interact with the substrate in such a way that spotting occurs.

Polyurethanes having pressure-sensitive adhesive properties can also be obtained, as demonstrated in JP 2000 073 040

A1 (Toyo) and JP 2000 256 638 A1 (Toyo), by using not only polyethers but also polyesters and also two different catalysts within a polyol component formula. A particular drawback in this case is the increased preparation complexity resulting from the formulas.

JP 2000 328 034 A1 (Toyo), U.S. Pat. No. 3,761,307 A (Dahl) and U.S. Pat. No. 3,925,283 A (Dahl, Continental Tapes) describe pressure-sensitive adhesive polyurethane/-ureas which are obtained by incorporating additional amine-type chain extenders or crosslinkers into the polymer. Drawbacks perceived are the complexity in preparation and the assumed low selectivity of the pressure-sensitive adhesiveness on different substrates.

DE 21 39 640 A1 (Dollhausen et al., Bayer) describes a PSA based on an aromatic diisocyanatourethane. A particular drawback is the yellowing tendency, which is typical of aromatic polyurethanes.

In order to achieve pressure-sensitive adhesion properties DE 100 30 908 A1 (Bolte et al., Henkel) and EP 0 081 103 A1 (Miyake et al., Takeda) proposed using two different isocyanates within a polyurethane composition. In these cases too the complexity in preparation is found to be a drawback, as is the low selectivity of the pressure-sensitive adhesiveness on different substrates.

WO 97/22642 A1 (Chang et al., Bristol Myers Squibb) proposes, for the preparation of a PSA, heating an NCO-terminated prepolymer and a polyhydroxy compound together at a certain temperature until a gel fraction of 30 to 40% is obtained. A disadvantage of this method is the low selectivity of the pressure-sensitiveness on different surfaces, which results from the relatively low gel content.

U.S. Pat. No. 3,796,678 A (Bartizal, 3M) discloses a polyurethane PSA based on capped isocyanate prepolymers which relies on water or organic solvents for its preparation. The complex nature of the preparation is regarded as a drawback, along with the unavoidable need to use water or solvents.

A polyurethane latex PSA is described in WO 98/31760 A1 (Schrock et al., Dow Chemical). A drawback is the need for drying, which makes it either impossible or at least very time-consuming to obtain blister-free, relatively thick PSA films.

Certain publications define a polyurethane PSA by way of the crosslinking density. GB 1,113,925 A (Weller) and GB 1,216,672 A (Grindley) propose chain lengths of 130 to 285 chain atoms and, respectively, more than 285 chain atoms between the crosslinking points. In practice it has been found that controlling the PSA properties by way of the criterion of chain length alone is an impossibility. An insufficient crosslinking density results in severe peel increase on the majority of substrates after a prolonged bonding period, while too high a crosslinking density leads to PSAs whose pressure-sensitive adhesiveness is inadequate. Surface-specific selectivity of the PSA properties is not attained.

EP 1 088 871 A1 (Heguri et al., Sekisui) prescribes a certain distance between the isocyanate groups, or a certain degree of crosslinking, for the polyisocyanate used. The molecular weight between two isocyanate groups in the polyisocyanate is intended to amount to from 220 to 570. This way of controlling the crosslinking density by way of the chain length within the polyisocyanate is likewise unlikely to improve the substrate-specific selectivity of the PSA properties.

In U.S. Pat. No. 6,040,028 A (Cline et al., Bayer) as well a polyurethane adhesive (contact adhesive) is defined by way of the molecular weight between crosslinking points. A molecular weight of between 7000 and 16000 is prescribed. Further restrictions are imposed, to the effect, inter alia, that from 0 to 10% of the polyols must have a molecular weight of from 60 to 400 and from 90 to 100% of the polyols must have a molecular weight of from 1800 to 12000.

Here again it must be assumed that the PSA properties are not selectively substrate-specific and that on the majority of substrates there will be a sharp peel increase following prolonged adhesive bonding, since the crosslinking density is relatively low and no indications of a possible solution to the problem are given.

WO 01/62818 A1 (Hansen et al., 3M) proposes reacting two polyols or other NCO-reactive materials with isocyanates for the preparation of a polyurethane PSA, the isocyanate-reactive components differing from one another in that one has a molecular weight of more than 2000 and one has a molecular weight of less than 2000.

PSAs of this kind are known inter alia from U.S. Pat. No. 5,227,409 A and U.S. Pat. No. 3,437,622 A, which also includes the restriction whereby the isocyanate-reactive components are almost exclusively diols. Additionally, polyurethanes with such a composition have already been described in EP 1 095 993 A1 and EP 1 101 807 A1, the last-mentioned examples not relating to compositions intended for the obtainment of PSAs. The proposed reaction product in WO 01/62818 A1 is therefore not definitively a PSA. There are no references to a substrate-specific selectivity of the PSA properties.

It is an object of the invention to provide a pressure-sensitive adhesive which adheres well to polar plastics surfaces, which is removable easily and softly and also without clattering and without damaging the plastics surfaces on removal, and without leaving residues or spots with a greasy appearance, which, additionally, can be used more than once, can be removed by washing and is stable to light, and which does not display the above-described drawbacks of the prior art, or not to the extent described.

SUMMARY OF THE INVENTION

The invention accordingly provides a pressure-sensitive adhesive based on polyurethane wherein the polyurethane is composed of the following starting materials which are reacted with one another in the stated proportions:
a) at least one aliphatic or alicyclic polyisocyanate having a functionality of in each case less than or equal to three,
b) a combination of at least one triol A based on polypropylene glycol and having an average number-averaged molecular weight $M_n$ of less than or equal to 1000 and a triol B based on polypropylene glycol and having an average number-averaged molecular weight $M_n$ of greater than or equal to 1000, preferably greater than or equal to 3000, the ratio of the number of hydroxyl groups of the triol component A to the number of hydroxyl groups of the triol component B being between greater than 0 and 12.

The ratio of the number of isocyanate groups to the total number of hydroxyl groups is between 0.8 and 1.15, preferably between 0.95 and 1.05.

The catalyst for the reaction to the polyurethane consists of or comprises a compound comprising bismuth and carbon, preferably a bismuth carboxylate or a bismuth carboxylate derivative.

DETAILED DESCRIPTION

In order to produce polyurethanes having sufficient light stability it is necessary to use aliphatic or alicyclic polyisocyanates or polyisocyanates containing isocyanate groups which are not aromatically attached. Surprisingly it has been found that aliphatic or alicyclic polyisocyanates are suitable for producing the other desired properties of the polyurethane PSAs in accordance with the object of the invention. The surface-specific easy and soft removability in particular can be adjusted to the use of aliphatic or alicyclic polyisocyanates.

In one particularly advantageous embodiment the aliphatic or alicyclic polyisocyanates used are diisocyanates having in each case an asymmetrical molecular structure, in which, therefore, the two isocyanate groups each possess a different reactivity. In particular the tendency otherwise typically found with pressure-sensitive adhesive polyurethanes, namely that of leaving spots of greasy appearance on paper or paperboard, is markedly reduced through the use of aliphatic or alicyclic diisocyanates having an asymmetric molecular structure. By an asymmetric molecular structure is meant the absence from the molecule of elements of symmetry (for example mirror planes, axes of symmetry, centres of symmetry); in other words, the impossibility of performing any symmetry operation to produce a molecule congruent with the starting molecule.

Examples of suitable polyisocyanates in accordance with the invention are butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane diisocyanate, 1,4-diisocyanatocyclohexane, 1,3-diiso-cyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane(isophorone diisocyanate), 1-methyl-2,4-diisocyanato-cyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanato-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, chlorinated, brominated, sulphur-containing or phosphorus-containing aliphatic or alicyclic diisocyanates, and also derivatives of the diisocyanates listed, especially dimerized or trimerized types.

In one preferred embodiment dicyclohexylmethane diisocyanate is used.

In one particularly preferred embodiment isophorone diisocyanate is used.

With regard to the substantive and quantitative composition of the starting materials reacted with the polyisocyanate it has surprisingly been found that combinations of at least one triol A based on polypropylene glycol and having an average number-averaged molecular weight $M_n$ of less than or equal to 1000 and at least one triol B based on polypropylene glycol and having an average number-averaged molecular weight $M_n$ of greater than or equal to 1000, preferably greater than or equal to 3000, are suitable for producing polyurethanes having the desired profile of properties in accordance with the object of the invention.

As polypropylene glycols it is possible to use all commercially customary polyethers based on propylene oxide and a trifunctional starter. Included here are not only the polypropylene glycols prepared conventionally—that is, generally, using a basic catalyst, such as potassium hydroxide, for example—but also the particularly pure polypropylene glycols prepared by DMC (Double metal cyanide) catalysis, whose preparation is described in, for example, U.S. Pat. No. 5,712,216 A, U.S. Pat. No. 5,693,584 A, WO 99/56874 A1, WO 99/51661 A1, WO 99/59719 A1, WO 99/64152 A1, U.S. Pat. No. 5,952,261 A, WO 99/64493 A1 and WO 99/51657 A1. A characteristic of the DMC-catalysed polypropylene glycols is that the "nominal" or theoretical functionality of precisely three in the case of the triols is also actually achieved approximately.

In the case of the conventionally prepared polypropylene glycols the "true" functionality is always somewhat lower than the theoretical functionality, particularly in the case of polypropylene glycols having a relatively high molecular weight. The reason for this is a secondary reaction of rearrangement of the propylene oxide to form allyl alcohol.

It is also possible to use all polypropylene glycol triols containing terminally copolymerized ethylene oxide, which is the case in many commercially customary polypropylene glycols, in order to obtain an increased reactivity towards isocyanates.

By varying the ratio of the number of hydroxyl groups in the triol A to that in the triol B within the stated boundaries it is possible to adjust the bond strength in accordance with the application. Surprisingly it has been found that the bond strength passes first through a minimum and then climbs significantly as the fraction of OH groups of the triol A increases in relation to the number of OH groups of the triol B.

The bond strength range which can be set within the stated boundaries is, in the preferred embodiments, approximately between 0.01 and 2.0 N/cm, but in other embodiments may even attain values of up to about 4.0 N/cm.

In one possible embodiment the polyurethane-based PSA includes further formulating ingredients such as, for example, catalysts, ageing inhibitors (antioxidants), light stabilizers, UV absorbers, rheological additives, colour pigments, and other auxiliaries, effect-producing substances and additives.

In the selection of these substances it should be ensured that they do not have any tendency to migrate to the substrate to be bonded, so that there is no spotting occurring in this way. For the same reason the concentration of these substances, particularly the liquid substances, in the composition as a whole is to be kept as low as possible. The additional use of plasticizers or tackifier resins should therefore be avoided.

In order further to accelerate the reaction between the isocyanate component and the isocyanate-reactive component it is possible to use additional catalysts known to the person skilled in the art, such as tertiary amines or organotin compounds, for example.

The use of antioxidants, though advantageous, is not mandatory.

Suitable antioxidants include for example sterically hindered phenols, hydroquinones, sterically hindered amines, organic sulphur compounds and organic phosphorus compounds.

Light stabilizers and UV absorbers can also be used but are not mandatory.

Light stabilizers preferably used are those disclosed in Gaechter and Müller, Taschenbuch der Kunststoff-Additive, Munich 1979, in Kirk-Othmer (3.) 23, 615-627, in Encycl. Polym. Sci. Technol. 14, 125-148 and in Ullmann (4.) 8, 21; 15, 254, 676.

Examples of Theological additives are pyrogenic silicas, phyllosilicates (bentonites), high molecular mass polyamide powders or castor oil derivative powders.

The colour pigments used may be organic or inorganic in nature. Examples are all kinds of organic or inorganic colour pigments, particularly white pigments such as titanium dioxide, for instance.

In one advantageous development of the invention the pressure-sensitive adhesive is in the form of diecuts or cut shaped parts.

In one preferred embodiment the pressure-sensitive adhesive is prepared continuously in accordance with the process described below A vessel A is charged substantially with the premixed polypropylene glycol combination (polyol component) and a vessel B is charged substantially with the isocyanate component, it being possible for the other formulating ingredients to have been mixed into these components beforehand in a standard mixing procedure.

The polyol component and the isocyanate component are conveyed via precision pumps through the mixing head or mixing tube of a multi-component mixing and metering unit, where they are homogenously mixed and so brought to reaction. The chemically inter-reactive components mixed in this way are applied immediately thereafter to a sheet-like backing material which is preferably moving at a constant speed. The nature of the backing material depends on the article to be produced. It may be an antiadhesively treated material (for example, release paper or release film) or any desired other sheetlike material, for example a polymeric film (for example, polyester, PE, PP, PVC), a paper, creped paper, a woven fabric, a nonwoven, or a metal foil. The backing material coated with the reactive polyurethane composition is passed through a heating tunnel in which the polyurethane composition cures to the PSA. The coatweight of the polyurethane composition is freely selectable. It depends on the article to be produced. Finally the coated backing material is wound up in a winding station.

The process described allows solvent-free and water-free operation. Solvent-free and water-free operation is the preferred procedure, but is not mandatory. In order, for example, to obtain particularly low coatweights, the components can be diluted appropriately. In order to enhance the anchorage of the polyurethane composition on the non-antiadhesively treated sheet-like materials it is possible to use any known method of surface treatment, such as corona pretreatment, flaming, gas-phase treatment (fluorination, for example). It is possible to use any known methods of priming, in which case the primer layer can be applied either from solution or dispersion to the polyolefin foil or else in an extrusion or coextrusion process.

In order to improve the unwind properties of the wound roll it is possible to precoat the reverse of the sheet-like material with a release coating material or for the reverse to carry a co-extruded or extruded-on release coating.

A polyurethane-based pressure-sensitive adhesive according to the invention exhibits outstanding product properties which even the person skilled in the art could have not foreseen in such a way.

The pressure-sensitive adhesive is suitable for fastening or fixing small articles, for example, having sensitive surfaces of polar plastic, glass or metal in such a way that on the one hand these articles are held securely while on the other hand they can be removed without problems at any time, even after weeks or months, easily and softly and also without clattering, without the surfaces of the articles being damaged, contaminated or destroyed by the operation of adhering and removing. The PSA can be used as part of an overall bonding scheme for the adhesive bonding of articles in magazines, books, letters or to papers in general and after the articles have been detached can remain in the magazines, books, letters or papers in general, since it adheres only very weakly to paper and consequently there is no subsequent sticking together, or at least no irreversible sticking together, of individual pages in the magazines, books, letters or mutually superposed papers in general. Since the pressure-sensitive adhesive as described above also exhibits substantially no adhesion, or at least only weak adhesion, to human skin as well, there is no unpleasant sensation of stickiness on contact.

Following the detachment operation the PSA does not leave behind any residues or spots of greasy appearance on the articles and does not damage the articles, and in particular does not do so even when these articles are sensitive to mechanical influences, which is often the case with articles having very smooth surfaces.

The pressure-sensitive adhesive as described above can be used more than once without impairment to its bond strength. If the PSA is stored in the unbonded state in a normal environment for a prolonged period without a protective colouring, it naturally becomes dusty, and its bond strength is reduced as a result. Such a layer of dust can easily be removed again at any time using normal mains water. After drying, the original bond strength is immediately reestablished in full. Even large quantities of dust, sand or powders of all grain sizes can easily be removed again by washing.

By virtue of the fact that the PSA is stable to light, it can also be used for adhesive bonding on articles, materials or substrates which are exposed to light and sun, for example on or behind windowpanes or car windows. In general the PSA is equally suitable for both interior and exterior applications.

In summary the pressure-sensitive adhesive of the invention is particularly suitable for:
producing self-adhesive articles
producing adhesion films
damagelessly and residuelessly redetachable fixing of lightweight articles with sensitive surfaces, composed for example of polar plastics, glass or metal.

The intention of the text below is to illustrate the invention with reference to examples, though without wishing to thereby to restrict it.

The following test methods were used briefly to characterize the specimens produced in accordance with the processes described.

The test specimens were each produced by first mixing the individual substances of the respective A components under vacuum at a temperature of 70° C. for approximately two hours. Then, after cooling to 40° C., the B component was added, in accordance with the proportions indicated in the individual examples, and was mixed in homogeneously under vacuum for 30 seconds. The initially liquid, reactive polyurethane PSAs were coated with a coatweight of 50 g/m$^2$ onto a 23 µm polyester film and cured at 70° C. The measurements were made after an "ageing period" (at room temperature) of one week.

The bond strength was determined in accordance with PSTC-101 (peel adhesion). In accordance with this method the adhesive film, consisting of PSA layer and polyester film is applied to different substrates (steel, ABS, PS, PC, PVC) and then peeled under defined conditions by means of a tensile testing machine. The peel angle is in each case 180° and the peel speed 300 mm/min. The force required for peeling is the bond strength, which is reported with the units N/cm.

The tack measurement (measurement of the surface stickiness) was made by the die measurement method in accordance with ASTM D 2979-01 using the texture analyser TA 2 from the company SMS (Stable Micro Systems). In accordance with this method a cylindrical steel die is pressed with defined force and rate up to the sample under analysis and is removed again after a defined time at a defined rate. The test result is the maximum force required for its removal, reported with the units N.

The specific test parameters were as follows:

| | |
|---|---|
| cylinder radius: | 1 mm ⇒ cylinder area: 3.14 mm$^2$ |
| pressing rate: | 0.1 mm/s |
| pressing force: | 5 N |
| pressing time: | 0.01 s |
| removal rate: | 0.6 mm/s |

The testing of light stability was carried out using a so-called sunlight lamp from Osram with the designation ULTRA-VITALUX®, power output 300 W. The samples were uninterruptedly irradiated open from a distance of 50 cm. The temperature of the location of the samples was in each case approximately 60° C. Assessments were made of the colour change of the PSA and also of the change in bond strength in each case after a period of irradiation of one week. This corresponds approximately to a 10-fold uninterrupted real summer sun exposure in central Europe.

EXAMPLES

Table 1 lists the base materials used to prepare the polyurethane PSAs, in each case with their trade names and manufacturer. The raw materials cited are all freely available commercially.

TABLE 1

Base materials used to prepare the polyurethane PSAs

| Trade name | Chemical basis | Average number-averaged molecular weight $M_n$ (g/mol) | OH or NCO number (mmol OH/kg or mmol NCO/kg | Manufacturer/ supplier |
|---|---|---|---|---|
| Voranol CP 450 ® | Polypropylene glycol, triol | 400 | 6595 | Dow |
| Voranol CP 1055 ® | Polypropylene glycol, triol | 1000 | 2781 | Dow |
| Voranol CP 3055 ® | Polypropylene glycol, triol | 3000 | 1007 | Dow |
| Voranol CP 4755 ® | Polypropylene glycol, triol | 4700 | 615 | Dow |
| Voranol CP 6055 ® | Polypropylene glycol, triol | 6000 | 490 | Dow |
| Vestanat IPDI ® | Isophorone diisocyanate | | 8998 | Degussa |
| Desmodur W ® | Dicyclohexyl-methane diisocyanate | | 7571 | Bayer |
| Desmodur N 3300 ® | Aliphatic polyisocyanate based on hexamethylene diisocyanate | | 5190 | Bayer |
| Tinuvin 292 ® | Sterically hindered amine, light stabilizer and ageing inhibitor | | | Ciba |
| Tinuvin 400 ® | Triazine derivative, UV protectant Bismuth trisneodecanoate CAS No. 34364-26-6 | | | Ciba |
| Mark DBTL ® | Dibutyltin dilaurate | | | Nordmann, Rassmann |

Example 1

The composition of the inventive polyurethane PSA is as follows:

NCO/OH ratio: 1.00
Ratio of number of OH triol A/number of OH triol B: 10.0

| | Ingredient | Weight fraction [% by weight] | Number of OH or NCO groups based on the percentage weight fraction given |
|---|---|---|---|
| A component | Voranol CP450 ® (triol A) | 48.3 | 318.9 mmol OH |
| | Voranol CP1055 ® (triol B) | 11.5 | 31.9 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 39.0 | 350.8 mmol NCO |

The test specimens (50 g/m$^2$ polyurethane PSA on 23 μm polyester film; see above) achieved the following bond strengths:

0.05 N/cm on steel,
0.06 N/cm on ABS,
0.07 N/cm on PS,
0.09 N/cm on PC,
0.09 N/cm on PVC.

The test specimens were in each case removable from the test substrate without clattering.

The tack measurement (on steel) gave a figure of 0.3 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers.

The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 2

The composition of the inventive polyurethane PSA is as follows:

| | | | |
|---|---|---|---|
| NCO/OH ratio: 1.00 | | | |
| Ratio of number of OH triol A/number of OH triol B: 4.0 | | | |
| | Ingredient | Weight fraction [% by weight] | Number of OH or NCO groups based on the percentage weight fraction given |
| A component | Voranol CP450 ® (triol A) | 39.4 | 259.7 mmol OH |
| | Voranol CP1055 ® (triol B) | 23.3 | 64.9 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 36.1 | 324.6 mmol NCO |

The test specimens (50 g/m² polyurethane PSA on 23 μm polyester film; see above) achieved the following bond strengths:
0.02 N/cm on steel,
0.03 N/cm on ABS,
0.03 N/cm on PS,
0.04 N/cm on PC,
0.06 N/cm on PVC.

The test specimens were in each case removable from the test substrate without clattering.

The tack measurement (on steel) gave a figure of 0.1 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 3

The composition of the inventive polyurethane PSA is as follows:

| | | | |
|---|---|---|---|
| NCO/OH ratio: 1.00 | | | |
| Ratio of number of OH triol A/number of OH triol B: 0.1 | | | |
| | Ingredient | Weight fraction [% by weight] | Number of OH or NCO groups based on the percentage weight fraction given |
| A component | Voranol CP450 ® (triol A) | 3.0 | 19.9 mmol OH |
| | Voranol CP1055 ® (triol B) | 71.5 | 198.8 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 24.3 | 218.7 mmol NCO |

The test specimens (50 g/m² polyurethane PSA on 23 μm polyester film; see above) achieved the following bond strengths:
0.04 N/cm on steel,
0.06 N/cm on ABS,
0.06 N/cm on PS,
0.08 N/cm on PC,
0.08 N/cm on PVC.

The test specimens were in each case removable from the test substrate without clattering.

The tack measurement (on steel) gave a figure of 0.2 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 4

The composition of the inventive polyurethane PSA is as follows:

| | | | |
|---|---|---|---|
| NCO/OH ratio: 1.00 | | | |
| Ratio of number of OH triol A/number of OH triol B: 4.0 | | | |
| | Ingredient | Weight fraction [% by weight] | Number of OH or NCO groups based on the percentage weight fraction given |
| A component | Voranol CP450 ® (triol A) | 27.8 | 183.4 mmol OH |
| | Voranol CP3055 ® (triol B) | 45.5 | 45.8 mmol OH |

-continued

| | | Weight fraction [% by weight] | Number of OH or NCO groups based on the percentage weight fraction given |
|---|---|---|---|
| | Ingredient | | |
| | Bismuth trisneodecanoate | 0.3 | |
| | Tinuvin 292 ® | 0.3 | |
| | Tinuvin 400 ® | 0.6 | |
| B component | Vestanat IPDI ® | 25.5 | 229.2 mmol NCO |

NCO/OH ratio: 1.00
Ratio of number of OH triol A/number of OH triol B: 4.0

The test specimens (50 g/m² polyurethane PSA on 23 μm polyester film; see above) achieved the following bond strengths:
0.08 N/cm on steel,
0.12 N/cm on ABS,
0.13 N/cm on PS,
0.14 N/cm on PC
0.16 N/cm on PVC.

The test specimens were in each case removable from the test substrate without clattering.

The tack measurement (on steel) gave a figure of 0.3 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 5

The composition of the inventive polyurethane PSA is as follows:

NCO/OH ratio: 1.00
Ratio of number of OH triol A/number of OH triol B: 4.0

| | Ingredient | Weight fraction [% by weight] | Number of OH or NCO groups based on the percentage weight fraction given |
|---|---|---|---|
| A component | Voranol CP450 ® (triol A) | 21.5 | 141.7 mmol OH |
| | Voranol CP4755 ® (triol B) | 57.6 | 35.4 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 19.7 | 177.2 mmol NCO |

The test specimens (50 g/m² polyurethane PSA on 23 μm polyester film; see above) achieved the following bond strengths:
0.10 N/cm on steel,
0.13 N/cm on ABS,
0.17 N/cm on PS,
0.19 N/cm on PC,
0.21 N/cm on PVC.

The test specimens were in each case removable from the test substrate without clattering.

The tack measurement (on steel) gave a figure of 0.4 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 6

The composition of the inventive polyurethane PSA is as follows:

NCO/OH ratio: 1.00
Ratio of number of OH triol A/number of OH triol B: 10.0

| | Ingredient | Weight fraction [% by weight] | Number of OH or NCO groups based on the percentage weight fraction given |
|---|---|---|---|
| A component | Voranol CP450 ® (triol A) | 31.3 | 206.7 mmol OH |
| | Voranol CP6055 ® (triol B) ® | 42.2 | 20.7 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 25.3 | 227.4 mmol NCO |

The test specimens (50 g/m² polyurethane PSA on 23 μm polyester film; see above) achieved the following bond strengths:
0.51 N/cm on steel,
0.62 N/cm on ABS,
0.76 N/cm on PS,
0.85 N/cm on PC,
0.80 N/cm on PVC.

The test specimens were in each case removable from the test substrate without clattering.

The tack measurement (on steel) gave a figure of 1.2 N. After one week of irradiation with the sunlight lamp there were no changes, either in colour or in bond strength. The adhesion to paper and paperboard was extremely low. The PSA was removable from the substrates simply by shaking.

The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 7

The composition of the inventive polyurethane PSA is as follows:

NCO/OH ratio: 1.00
Ratio of number of OH triol A/number of OH triol B: 4.0

| | Ingredient | Weight fraction [% by weight] | Number of OH or NCO groups based on the percentage weight fraction given |
|---|---|---|---|
| A component | Voranol CP450 ® (triol A) | 18.7 | 123.4 mmol OH |
| | Voranol CP6055 ® (triol B) | 63.0 | 30.8 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 17.1 | 154.2 mmol NCO |

The test specimens (50 g/m$^2$ polyurethane PSA on 23 μm polyester film; see above) achieved the following bond strengths:

0.30 N/cm on steel,
0.46 N/cm on ABS,
0.50 N/cm on PS,
0.60 N/cm on PC,
0.75 N/cm on PVC.

The test specimens were in each case removable from the test substrate without clattering.

The tack measurement (on steel) gave a figure of 0.9 N. After a week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 8

The composition of the inventive polyurethane PSA is as follows:

NCO/OH ratio: 1.00
Ratio of number of OH triol A/number of OH triol B: 0.1

| | Ingredient | Weight fraction [% by weight] | Number of OH or NCO groups based on the percentage weight fraction given |
|---|---|---|---|
| A component | Voranol CP450 ® (triol A) | 0.7 | 4.5 mmol OH |
| | Voranol CP6055 ® (triol B) | 92.6 | 45.4 mmol OH |
| | Bismuth trisneodecanoate | 0.3 | |
| | Tinuvin 292 ® | 0.3 | |
| | Tinuvin 400 ® | 0.6 | |
| B component | Vestanat IPDI ® | 5.5 | 49.9 mmol NCO |

The test specimens (50 g/m$^2$ polyurethane PSA on 23 μm polyester film; see above) achieved the following bond strengths:

0.40 N/cm on steel,
0.54 N/cm on ABS,
0.54 N/cm on PS,
0.81 N/cm on PC,
0.90 N/cm on PVC.

The test specimens were in each case removable from the test substrate without clattering.

The tack measurement (on steel) gave a figure of 1.0 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 9

The composition of the inventive polyurethane PSA is as follows:

NCO/OH ratio: 1.00
Ratio of number of OH triol A/number of OH triol B: 4.0

| | Ingredient | Weight fraction [% by weight] | Number of OH or NCO groups based on the percentage weight fraction given |
|---|---|---|---|
| A component | Voranol CP450 ® (triol A) | 18.1 | 119.5 mmol OH |

-continued

| | | NCO/OH ratio: 1.00 | | |
|---|---|---|---|---|
| | Ratio of number of OH triol A/number of OH triol B: 4.0 | | | |
| | Ingredient | | Weight fraction [% by weight] | Number of OH or NCO groups based on the percentage weight fraction given |
| | Voranol CP6055 ® (triol B) | | 61.0 | 29.9 mmol OH |
| | Bismuth trisneodecanoate | | 0.3 | |
| | Tinuvin 292 ® | | 0.3 | |
| | Tinuvin 400 ® | | 0.6 | |
| B component | Desmodur W ® | | 19.7 | 149.4 mmol NCO |

The test specimens (50 g/m² polyurethane PSA on 23 µm polyester film; see above) achieved the following bond strengths:
- 0.38 N/cm on steel,
- 0.50 N/cm on ABS,
- 0.55 N/cm on PS,
- 0.71 N/cm on PC,
- 0.91 N/cm on PVC.

The test specimens were in each case removable from the test substrate without clattering.

The tack measurement (on steel) gave a figure of 0.7 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Example 10

The composition of the inventive polyurethane PSA is as follows:

| | | NCO/OH ratio: 1.00 | | |
|---|---|---|---|---|
| | Ratio of number of OH triol A/number of OH triol B: 4.0 | | | |
| | Ingredient | | Weight fraction [% by weight] | Number of OH or NCO groups based on the percentage weight fraction given |
| A component | Voranol CP450 ® (triol A) | | 16.6 | 109.5 mmol OH |
| | Voranol CP6055 ® (triol B) | | 55.8 | 27.4 mmol OH |
| | Bismuth trisneodecanoate | | 0.3 | |
| | Tinuvin 292 ® | | 0.3 | |
| | Tinuvin 400 ® | | 0.6 | |
| B component | Desmodur N3300 ® | | 26.4 | 136.1 mmol NCO |

The test specimens (50 g/m² polyurethane PSA on 23 µm polyester film; see above) achieved the following bond strengths:
- 0.01 N/cm on steel,
- 0.03 N/cm on ABS,
- 0.03 N/cm on PS,
- 0.04 N/cm on PC,
- 0.04 N/cm on PVC.

The test specimens were in each case removable from the test substrate without clattering.

The tack measurement (on steel) gave a figure of 0.1 N. After one week of irradiation with the sunlight lamp there were no changes, either in colour or in bond strength. The adhesion to paper and paperboard was extremely low. The PSA was removable from the substrates simply by shaking. The PSA was stuck into a number of books, newspapers and magazines. Even after a bonding period of six months, the pages bonded in this way were readily removable from one another and the PSA could be removed readily without leaving residues or greasy spots and without damaging the papers. The PSA did not stick to the skin. Moreover, the PSA was removable by washing. For the purpose of testing it was sprinkled with fine-grained sand and, in a second test, with fine-grained talc. Both substances were easily removable again under running water. Subsequently the bond strength was at the original level. Repeat usability was tested by adhering the PSA to PVC and removing it again 20 times in succession. Thereafter the bond strength was still at the original level.

Comparative Examples

Comparative Example 1

| | | NCO/OH ratio: 0.60 | | |
|---|---|---|---|---|
| | Ratio of number of OH triol A/number of OH triol B: 4.0 | | | |
| | Ingredient | | Weight fraction [% by weight] | Number of OH or NCO groups based on the percentage weight fraction given |
| A component | Voranol CP450 ® (triol A) | | 22.4 | 154.0 mmol OH |
| | Voranol CP4755 ® (triol B) | | 62.6 | 38.5 mmol OH |
| | Bismuth trisneodecanoate | | 0.3 | |
| | Tinuvin 292 ® | | 0.3 | |
| | Tinuvin 400 ® | | 0.6 | |
| B component | Vestanat IPDI ® | | 12.8 | 115.5 mmol NCO |

The test specimens (50 g/m² polyurethane PSA on 23 µm polyester film, see above) achieved a bond strength on steel of 6.2 N/cm. The PSA bonded very strongly to paper, and so could by no means be removed from the paper simply by shaking. Moreover, even after a short time, it left spots with a greasy appearance on the paper.

Comparative Example 2

NCO/OH ratio: 1.0
Ratio of number of OH triol A/number of OH triol B: 20.0

|   | Ingredient | Weight fraction [% by weight] | Number of OH or NCO groups based on the percentage weight fraction given |
|---|---|---|---|
| A component | Voranol CP450 ® (triol A) | 42.9 | 282.6 mmol OH |
|   | Voranol CP4755 ® (triol B) | 23.0 | 14.1 mmol OH |
|   | Bismuth trisneodecanoate | 0.3 |   |
|   | Tinuvin 292 ® | 0.3 |   |
|   | Tinuvin 400 ® | 0.6 |   |
| B component | Vestanat IPDI ® | 33.0 | 296.7 mmol NCO |

The test specimens (50 g/m² polyurethane on 23 μm polyester film, see above) achieved a bond strength on steel of 0.0 N/cm. Instead of a pressure-sensitive adhesive, a film-like, tack-free polyurethane had been formed.

The invention claimed is:

1. Polyurethane-based pressure-sensitive adhesive, wherein the polyurethane is composed of the following starting materials which are reacted catalytically with one another in the stated proportions:
   a) at least one aliphatic or alicyclic polyisocyanate having a functionality of in each case less than or equal to three,
   b) a combination of at least one triol A based on polypropylene glycol and having an average number-averaged molecular weight $M_n$ of less than or equal to 1000 and a triol B based on polypropylene glycol and having an average number-averaged molecular weight $M_n$ of greater than or equal to 1000, the ratio of the number of hydroxyl groups of the triol component A to the number of hydroxyl groups of the triol component B being more than 0 and up to 12, the ratio of the number of isocyanate groups to the total number of hydroxyl groups being between 0.8 and 1.15, the catalyst for the reaction to the polyurethane comprising a compound comprising bismuth and carbon.

2. Pressure-sensitive adhesive according to claim 1, wherein said at least one aliphatic or alicyclic polyisocyanate is a diisocyanate having an asymmetrical molecular structure.

3. Pressure-sensitive adhesive according to claim 1 wherein the polyisocyanate is a dicyclohexylmethane diisocyanate.

4. Pressure-sensitive adhesive according to claim 1, wherein said polypropylene glycols are prepared with a potassium hydroxide catalyst or with a DMC catalyst.

5. Pressure-sensitive adhesive according to claim 1, further comprising formulating ingredients selected from the group consisting of catalysts, ageing inhibitors, light stabilizers, UV absorbers, and rheological additives.

6. Pressure-sensitive adhesive according to claim 1, having a bond strength range between 0.01 and 4.0 N/cm.

7. Pressure-sensitive adhesive according to claim 1 in the form of diecuts or cut shaped parts.

8. A self-adhesive article comprising the pressure-sensitive adhesive of claim 1.

9. The self-adhesive article of claim 8, wherein said self-adhesive article is an adhesion film.

10. A method for the redetachable fastening, without damage or residue, of articles having sensitive surfaces, made from polar plastic, glass or metal, which comprises fastening said articles with the pressure sensitive adhesive of claim 1.

11. The pressure-sensitive adhesive of claim 1, wherein said molecular weight $M_n$ is greater than or equal to 3000.

12. The pressure-sensitive adhesive of claim 1, wherein said ratio of the number of isocyanate groups to the total number of hydroxyl groups is between 0.95 and 1.05.

13. The pressure-sensitive adhesive of claim 6, wherein said bond strength range is between 0.01 and 2.0 N/cm.

14. The pressure-sensitive adhesive of claim 1, wherein said compound comprising bismuth and carbon is a bismuth carboxylate or a bismuth carboxylate derivative.

* * * * *